United States Patent [19]

Lydy et al.

[11] Patent Number: 5,542,241
[45] Date of Patent: Aug. 6, 1996

[54] CONTROL FOR LAWN MOWERS AND THE LIKE AND OTHER WHEELED WALK BEHIND POWERED APPARATUS

[75] Inventors: Bruce S. Lydy, West Bend; Michael A. Keitel, Sheboygan; Jay K. Wissmueller, Port Washington, all of Wis.

[73] Assignee: Garden Way Incoporated, Troy, N.Y.

[21] Appl. No.: 128,982

[22] Filed: Sep. 27, 1993

[51] Int. Cl.⁶ .......................... A01D 34/68; A01D 69/08
[52] U.S. Cl. .................. 56/11.3; 56/11.8; 180/19.3
[58] Field of Search ...................... 56/11.3, 11.6, 56/11.7, 11.8, 10.5, 10.8; 180/19.3, 19.1; 192/11, 12 R, 17 R

[56] References Cited

U.S. PATENT DOCUMENTS

| | | | |
|---|---|---|---|
| 3,942,604 | 3/1976 | Black, III | 56/10.5 X |
| 4,230,200 | 10/1980 | Carolan | 56/11.3 X |
| 4,667,459 | 5/1987 | Scanland et al. | 180/19.3 X |
| 4,930,369 | 6/1990 | Barnard et al. | 56/10.8 X |
| 5,195,307 | 3/1993 | Thorud et al. | 56/11.3 |

Primary Examiner—Terry Lee Melius

[57] ABSTRACT

Walk behind lawn, garden and driveway apparatus having a motor driven set of wheels and a driven blade and including a selectively releasable wheel brake, the wheel brake being continuously biased into the engaged position and an operator moveable control for disengaging the drive to the blade with the connection between the brake control and blade drive control being effected through an interlock which mechanically precludes blade rotation unless the operator controlled brake is disengaged. A suitable control for applying drive power to the wheels can be provided so that not only is manual movement of the apparatus permitted with the brake disengaged and the blade drive engaged or disengaged but also upon actuation of a suitable control, the power to the wheels is applied. Such operator control is generally accomplished by providing rearwardly and upwardly extending handles from the frame of the apparatus which handles terminate in hand grips to which levers are pivotally mounted and connected to effect wheel brake release, application of power to the wheels, and with a separate non-handle bar control, engagement of the drive to the blade with the interlock precluding the blade drive from remaining engaged unless the brake is removed thereby signifying operator presence.

5 Claims, 7 Drawing Sheets

CONTROL FOR LAWN MOWERS AND THE LIKE AND OTHER WHEELED WALK BEHIND POWERED APPARATUS

FIELD OF THE INVENTION

This invention relates to control apparatus for lawn mowers, snow blowers and the like and is more particularly directed to such powered apparatus having brake and disengageable blade controls.

BACKGROUND OF THE INVENTION

Operator presence controls of the prior an generally require that the apparatus operator actuate a lever, which lever when released, serves to disconnect or ground the electrical system for the motor drive for the apparatus. Some prior an controls provide for braking of the blade in the event that the drive to the blade is disengaged.

OBJECTS OF THE INVENTION

It is a primary object of this invention to provide an improved control system for powered, walk-behind apparatus such as lawn mowers and snow blowers that, upon operator release of the presence control and without operator effort, disengages the drive to the rotating blade of the apparatus and applies a brake to the wheels of such apparatus.

It is a further object of this invention to provide a low cost and reliable control for such apparatus wherein an automatically operated interlock effects blade drive disengagement upon wheel brake application.

It is an additional object of this invention to provide interlock control apparatus for reliably combining automatic application of a wheel brake for the apparatus with automatic disengagement of the blade drive thereby to provide an improved operator presence control.

Other objects will be in part obvious and in pan pointed out more in detail hereinafter.

A better understanding of this invention will be obtained from the following detailed description and accompanying drawings of illustrative applications of the invention.

SUMMARY OF THE INVENTION

The present invention has particular utility for walk behind lawn, garden and driveway apparatus having a motor driven set of wheels and a driven blade and including a selectively releasable wheel brake, the wheel brake being continuously biased into the engaged position with an operator moveable control for engaging the drive to the blade, the connection between the wheel brake control and blade drive control being effected through an interlock which mechanically precludes blade rotation unless the operator controlled wheel brake is disengaged. A suitable control for applying drive power to the wheels can be provided so that not only is manual movement of the apparatus permitted with the brake disengaged and the blade drive engaged but also upon actuation of a suitable control, the power to the wheels is applied. This operator control is generally accomplished by providing rearwardly and upwardly extending handles from the frame of the apparatus which handles terminate in hand grips to which levers are pivotally mounted and connected to effect wheel brake release, application of power to the wheels, and with a separate non-handle bar control, engagement of the drive to the blade with the interlock precluding the blade drive from remaining engaged unless the brake is removed thereby signifying operator presence.

THE DRAWINGS

Although this invention has been illustrated and described with respect to exemplary embodiments thereof, it should be understood by those skilled in the art that various changes, omissions and additions may be made without departing from the spirit and scope of the invention.

DESCRIPTION OF A PREFERRED EMBODIMENT

Figure 1:
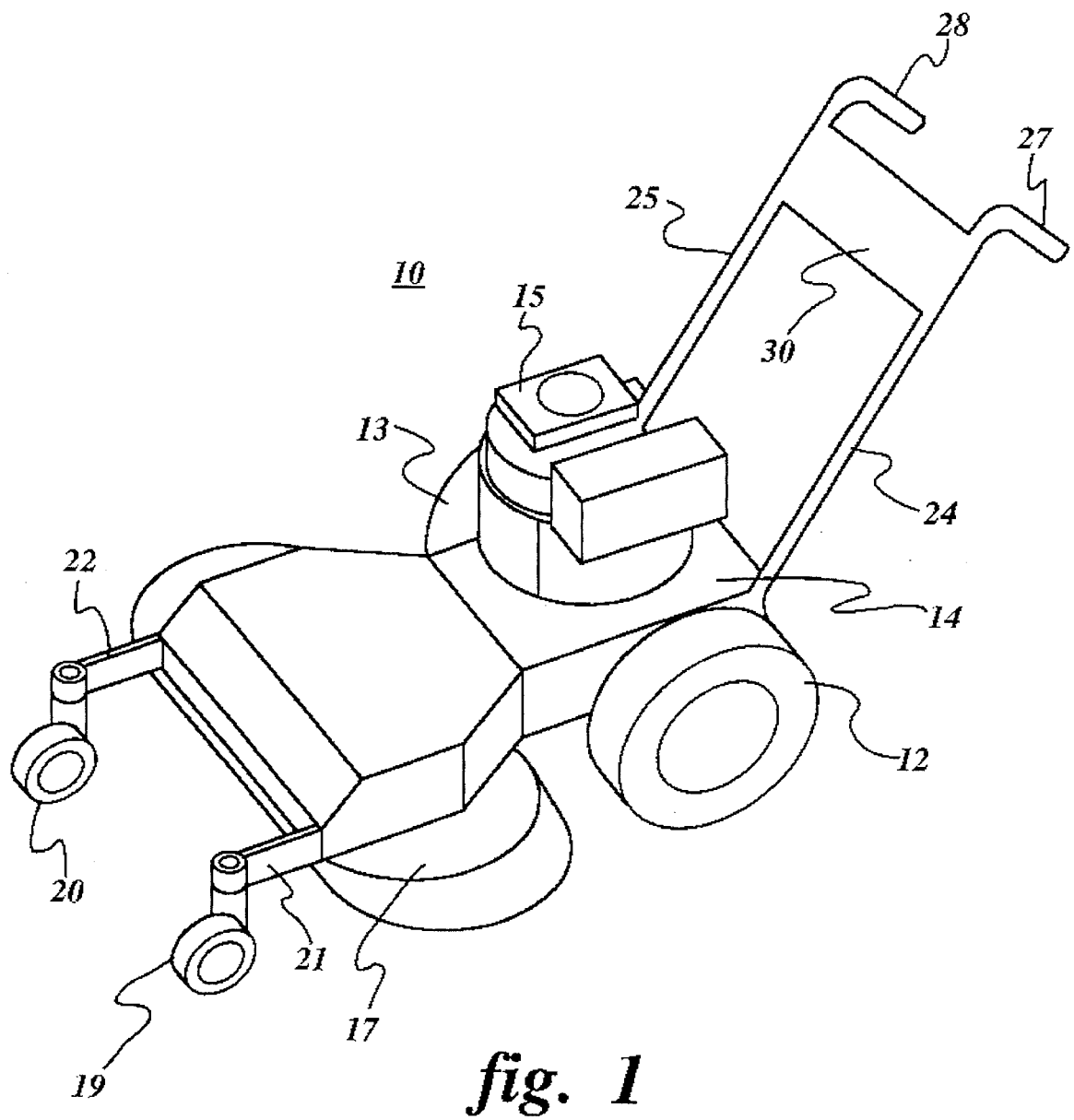
FIG. 1 is a schematic perspective view showing typical wide-cut lawn mower apparatus with which the present invention has utility.

Turning first to FIG. 1 of this application, the schematic view of a wide cut lawn mower generally designated 10, is shown as having rear drive wheels 12, 13, and a frame 14 on which is supported a suitable gasoline engine 15. Frame 14 supports a mower deck 17 with wheels 19 and 20 (caster wheels supported on extensions 21 and 22). The apparatus is conventionally guided with handle bars 24 and 25 which extended rearwardly and upwardly from frame 14, which handles terminate in grips 27 and 28 for engagement by the operator. Additionally, there is conventionally provided a control panel 30 near the upper end of the handles. Much of the associated structure has been omitted from FIG. 1 because that drawing is intended to show only the principal parts of a typical lawn mower in schematic perspective.

Figure 2:
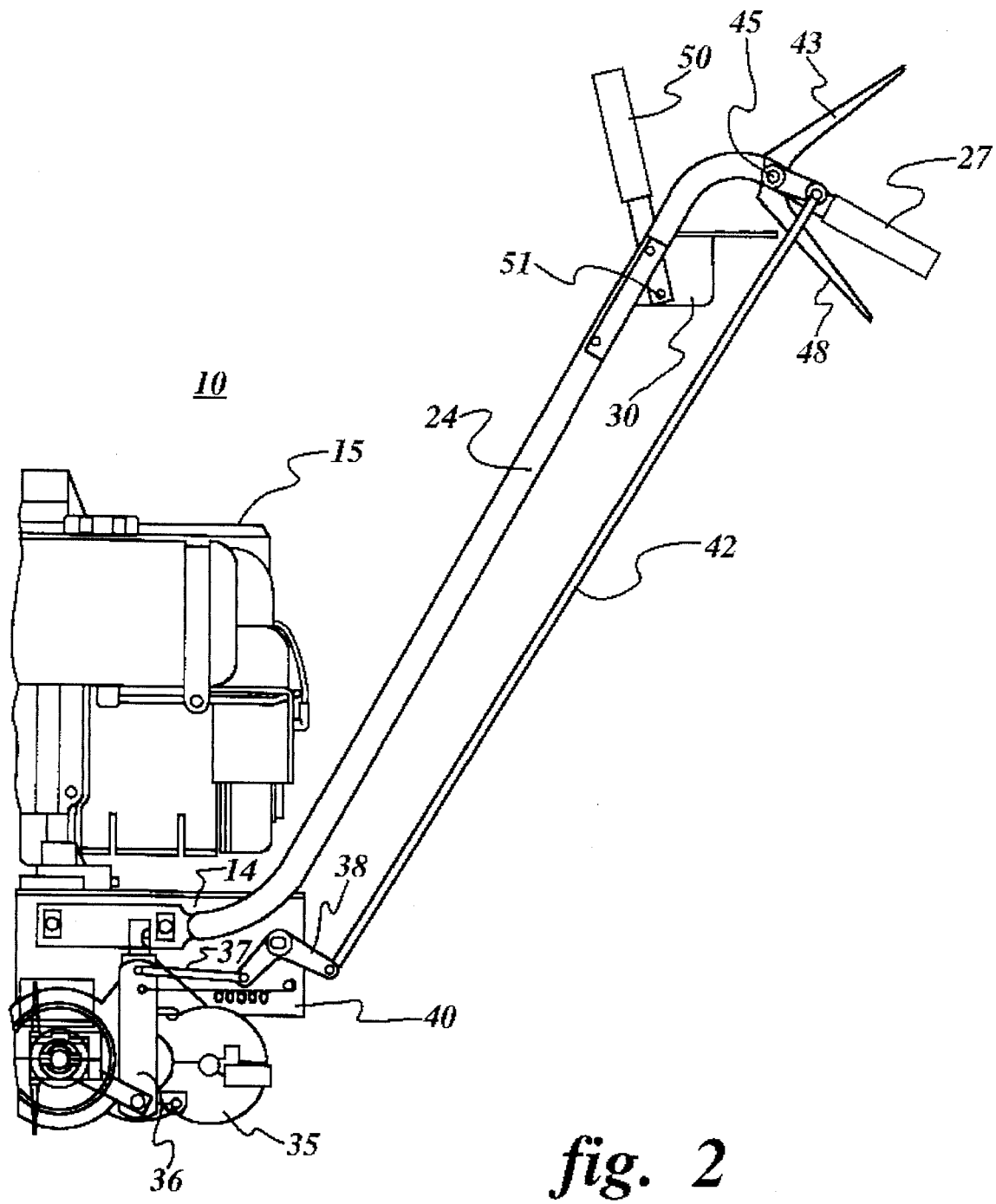
FIG. 2 is a partial side elevation view showing the rear portion (in more detail) of the apparatus of FIG. 1 with the rear drive wheels removed and illustrating the rearwardly extending handle bars, control operating levers and a portion of the automatic wheel brake control.

Turning next to FIG. 2 it is seen that the wheels for driving apparatus 10 have been removed to expose a transaxle generally designated 35, which transaxle is disclosed in greater detail in the aforementioned Wicker application entitled Automatic Brake Control, which disclosure is incorporated herein to the extent necessary. It is seen that brake lever 36 of the transaxle is pivotally connected to link 37 which in turn is connected to a belt crank 38 supported for rotation on frame 14. Lever 36 is biased by spring 40 to the brake-on position, the brake being an internal pan of the transaxle. Connecting rod 42 is pivotally connected to bell crank 38 and, at its other end, is connected to lever 43, which lever is generally referred to as an operator presence control in the aforementioned Wicker application. Lever 43 is operatively connected to rod 42 and pivotally supported at 45 on handle 27. For completeness, it is noted that lever 48 is also supported about the pivot point 45 and is connected, by any suitable means (not shown) to the throttle control for the lawn mower. Lever 50 is pivotally supported on console 30 at point 51 and is connected, as will be hereinafter described in greater detail, to the drive transmission for the lawn mower blades (not shown) by a suitable control rod (not shown in FIG. 2). With the controls in the position shown in FIG. 2, the operator presence control is in its raised position such that the wheel brake is applied by the force of spring 40 acting on lever 36, the throttle control is in the neutral position and lever 50 is in the disengaged position (see also FIG. 5). As shown, the machine controls are positioned as if no operator were present, hence the brake is applied to the drive wheels, the throttle is in its idle or off position and the drive to the blades is disengaged.

Figure 3A:
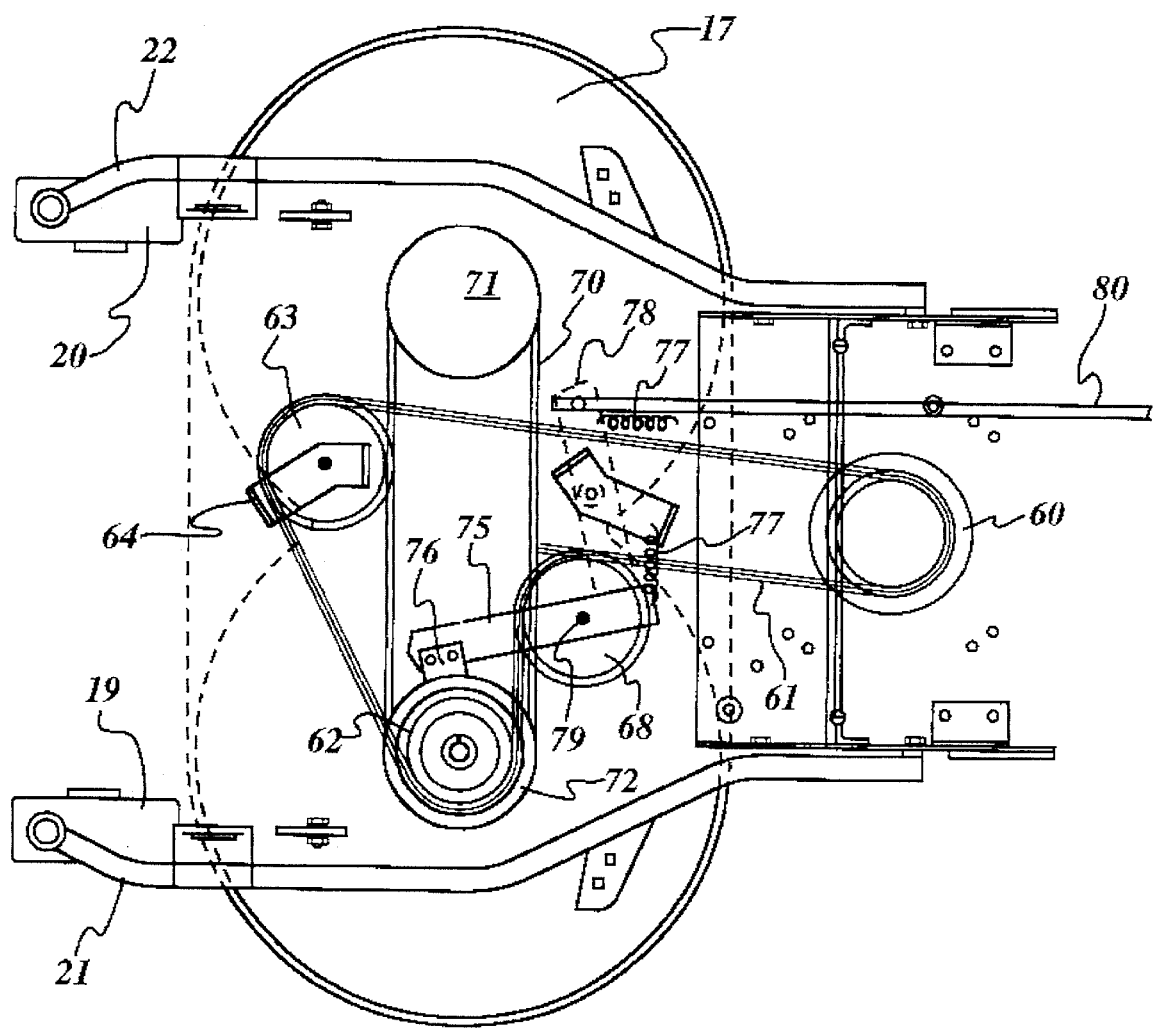
FIG. 3 is a top plan view of the apparatus generally shown in FIG. 1, partially in cross-section and showing handle lever position in partial view.
Figure 3B:
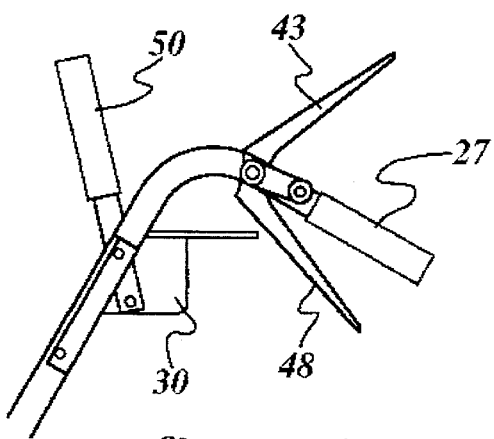

To more fully explain the prior art blade drive control mechanism, FIG. 3 is provided where in it is seen that main drive pulley 60, suitably connected to engine 15, is connected through a belt drive 61 to pulley 62 through idler pulley 63 supported on arm 64 affixed to mower deck 17; the belt 61 completes its path around idler pulley 68. Belt 70 interconnects pulleys 71 and 72 so that the power from engine 15 is communicated through belt 61 to a pair of lawn cutting blades (not shown) supported below mower deck 17 on suitable shafts extending through deck 17, which are connected to pulleys 71 and 72. In the position shown in FIG. 3, blade brake lever 75 supports, at one end, a brake pad 76, the lever being pivoted and connected to secondary lever 78 to form, in effect, a bell crank which is pivotally supported as at 79. Springs 77, serve to bias the lever and tension the belt. One end of lever 70 is connected to operating rod 80 which, as hereinafter explained, is connected to lever 50 through an interlock (not shown in FIG. 3). It will be observed that the controls shown partially in FIG. 3 are in the same position as shown for FIG. 2 namely, that there is no operator present to depress operator presence control lever 43 or to raise throttle lever 48 and lever 50 is in the blade drive "off" position such that brake 76 affixed to lever arm 75 is permitted to engage pulley 72 thereby to stop any blade rotation.

Figure 4A:
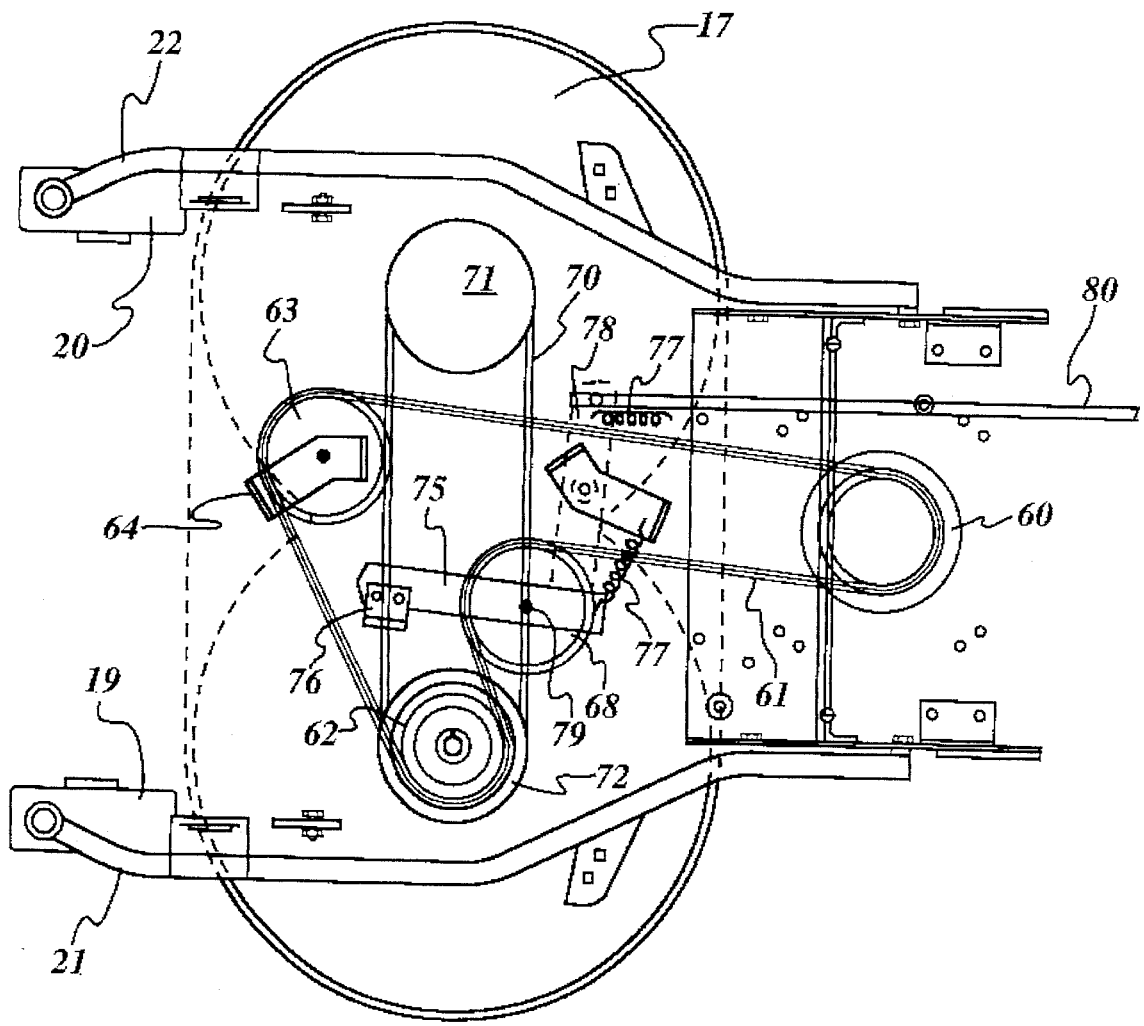
FIG. 4 is substantially the same view as FIG. 3 with the control and drive apparatus shifted to show engagement of the blade drive with the pulley brake disengaged.
Figure 4B:
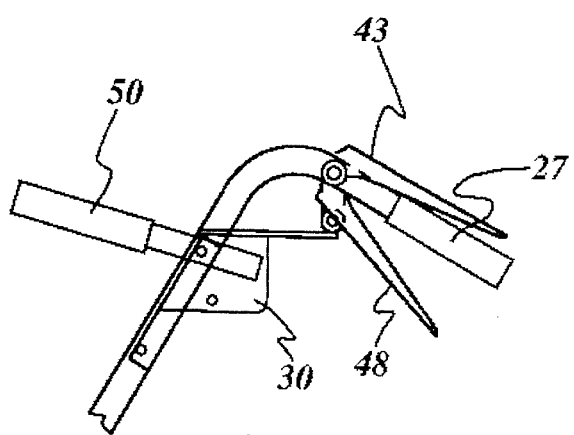

Turning next to FIG. 4, where like numbers refer to the same parts illustrated in FIG. 3, it is seen that the blade drive lever 50 is in its "on" or engaged position, thereby shifting control rod 80 to pivot lever 75 and release brake 76 thereby permitting engine power to be applied through pulley 60 and belt 61 to the two blades. The position of lever 43 is depressed as it would be if the operator were present and were grasping the handle bar 27 but throttle lever 48 remains in its substantially neutral or idle position.

Figure 5:
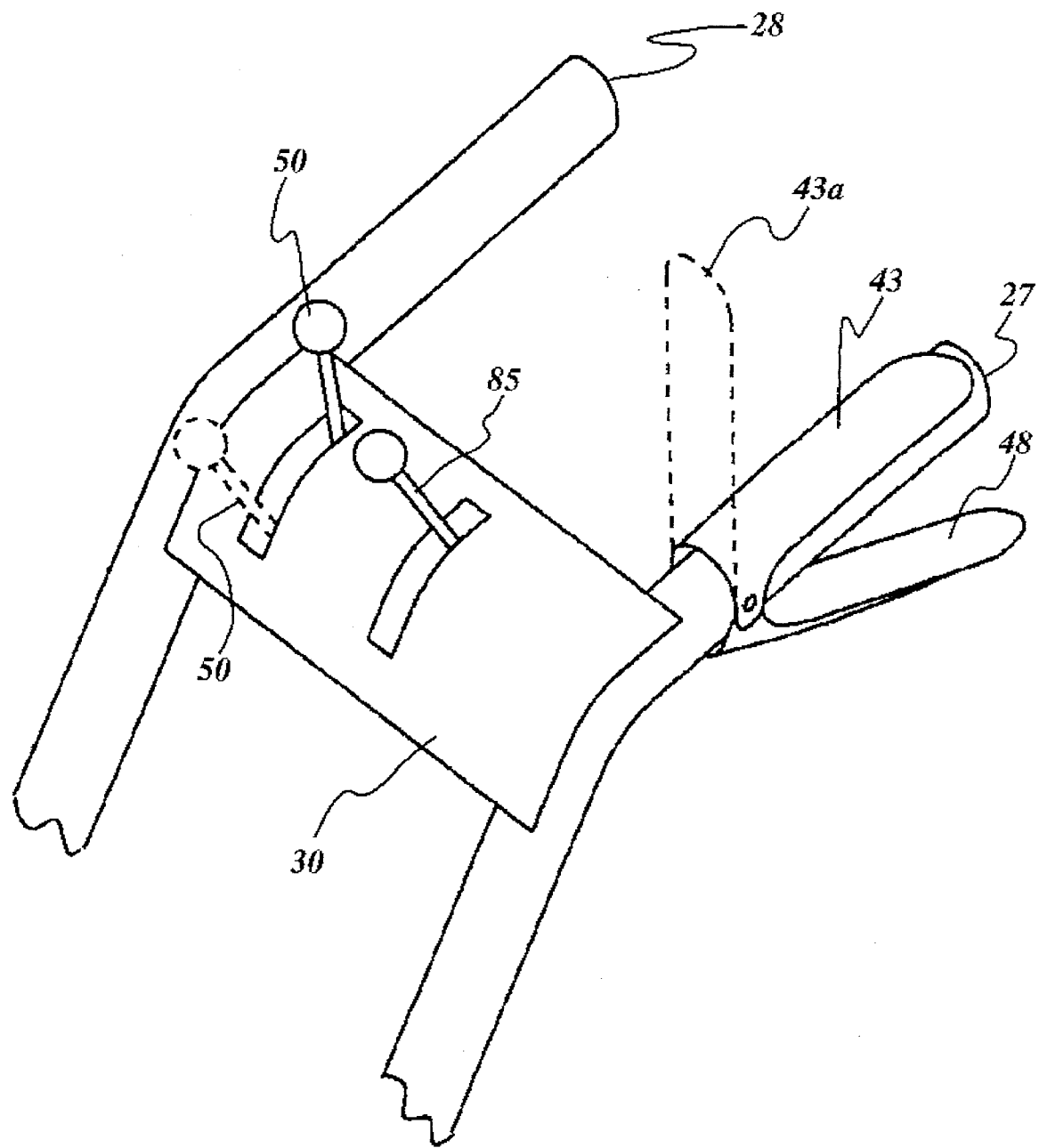
FIG. 5 is a partial handle bar/control illustration indicating in solid and dotted lines, various control positions.

For completeness, FIG. 5 presents a pictorial perspective of the handle bar ends and shows a typical gear shift lever 85 which is a conventional control and plays no part in the present invention. FIG. 5 shows the solid line position of blade drive control lever 50 in the "off" position with the dotted line showing the blade drive lever shifted to the engaged position. FIG. 5 also shows operator presence control lever 43 in the depressed position having been moved from the dotted line position 43a by the operator grasping the handle bar. Hence, and in accordance with the teachings of the aforementioned Wicker application, the brake is released by movement of lever 36 against the bias force of spring 40. The position of lever 48 is as desired by the operator so as to control the position of the engine throttle to give him the desired wheel speed after selection of the appropriate gear by shifting lever 85.

Figure 6:
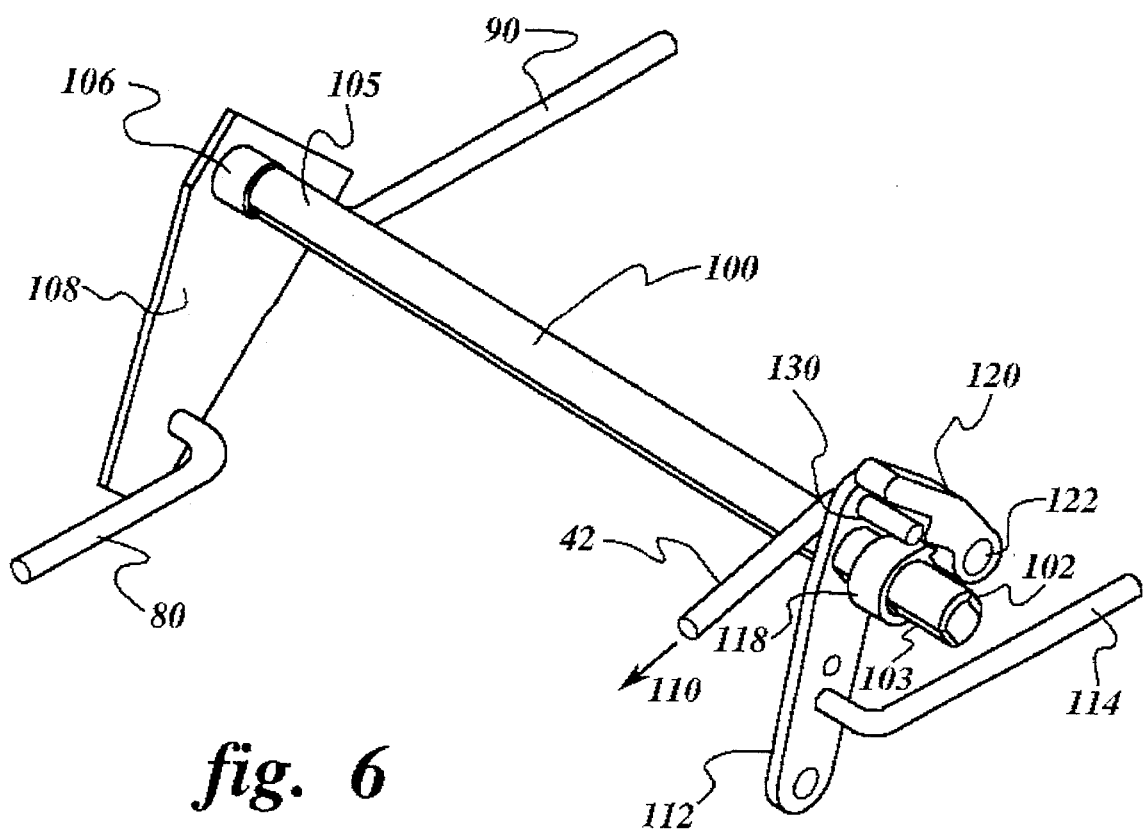
FIG. 6 illustrates an embodiment of a portion of the control interlock when there is no operator present such that the wheel brake is applied and the blade drive is disengaged.

As heretofore mentioned, a principal feature of the present invention is the provision of an interlock which precludes engagement of the drive to the blades unless the operator presence control lever has been depressed by the operator so as to release the brake. FIG. 6 illustrates one version of a suitable interlock with the various shafts, levers, and cams shown in FIG. 6 suitably supported on the frame of the mower or perhaps between the handle bars, as desired, and it noted for matters of accuracy, that FIG. 2 does not disclose any version of the interlock. Returning to FIG. 6, it is seen that shaft 100 is suitably supported for rotation and provided with opposed flats 102 and 103, with end portion 105 of shaft 100 fixedly received in collar 106 of lever 108, one end of lever 108 being pivotally connected to control rod 80 with the other end of lever 106 pivotally connected (pivot connection not shown) to continuing control rod portion 90 which, in turn, is connected to the blade drive "on-off" lever 50. At the other end of shaft 100 is a pivotal connection to a brake operating lever identified as 42 although it is to be recognized that the brake operating rod 42 of FIG. 2 has been divided in two pieces as was control member 80. But it is noted that control rod 42 is constantly biased in the direction of arrow 110 by the spring 40 attached to brake lever 36 of the transaxle. Control member 42 is affixed to lever 112 which has a round hole where shaft 100 passes so that it is capable of movement independently of shaft 100. Lever 112 is connected through member 114 to the operator presence control lever 43 as heretofore described. Cam 118 is affixed to and rotates with shaft 100 and there is provided a suitable cam follower 120 which is independently supported on a fixed pivot pin 122. Pin 130 can be fixed to lever 112 in any suitable manner so as to be engageable with the stepped cam follower 120 as shown in FIG. 6 when the apparatus is in the position where no operator is present; hence, cam follower 120 is held out of engagement with cam 18 such that any attempt to engage the blade drive requires constant application of force to lever 50 because shaft 1 00 will not be held in the position necessary to maintain control rod 80 in the "drive-on" position. Lever 112 biased in the direction of arrow 110 by the force of spring 40 of the brake.

Figure 7:
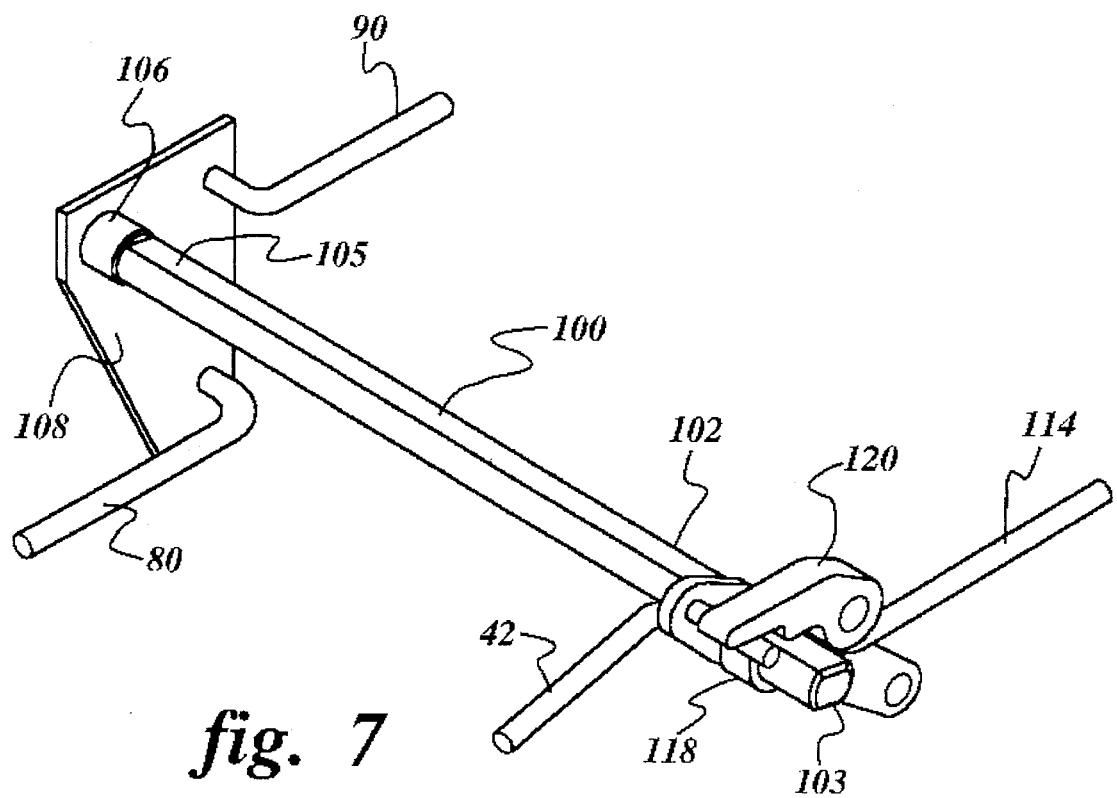
FIG. 7 shows the apparatus of FIG. 6 wherein the wheel brake is disengaged by movement of the handle bar lever.

Turning next to FIG. 7, it is seen that shaft 100 has rotated from the position of FIG. 6 by moving control rod 114 under the influence of the operator presence lever control. Control member 42 has been advanced against the force of spring 40 and the cam follower 120 is allowed to fall under the force of gravity to engage the step on cam 118 thereby holding shaft 100 in the desired rotated position, wherein control rod 80 has been shifted from the position of FIG. 6 by rotation of lever 108 under the effect of the advancement of lever 50 attached to control rod portion 90.

Figure 8:
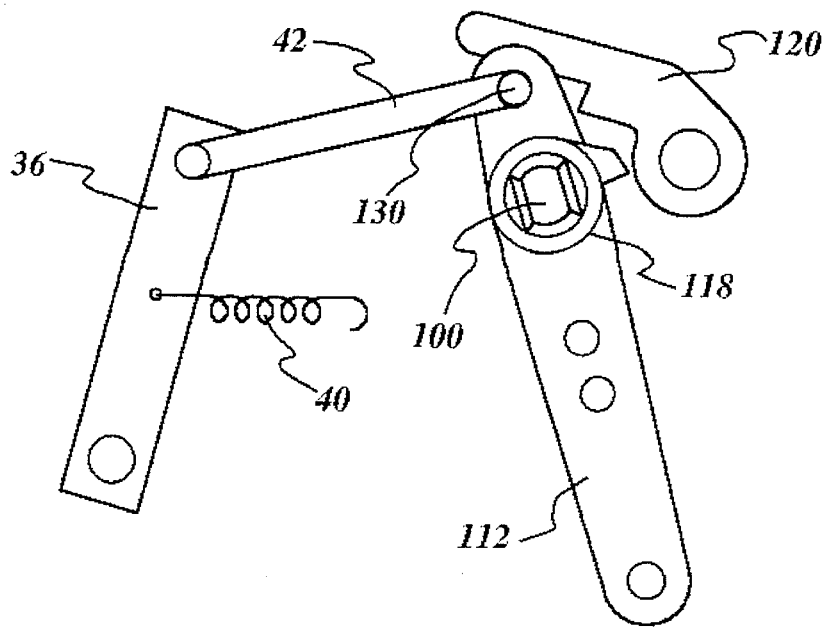
FIG. 8 is a schematic elevation view of the apparatus of FIGS. 6 and 7 wherein no operator is present.
Figure 9:
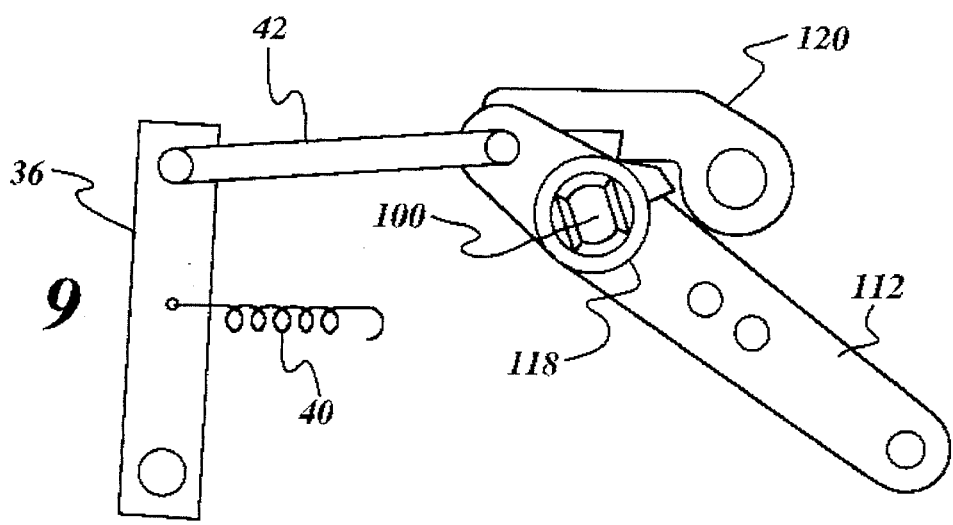
FIG. 9 is a schematic view of the interlock of FIG. 8 wherein the brake is in the "off" position and the blade drive is not engaged.
Figure 10:
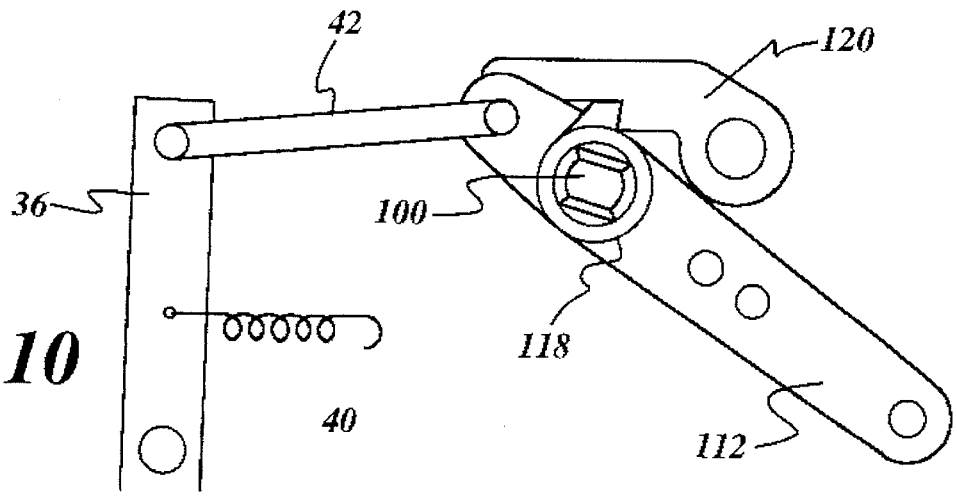
FIG. 10 is a schematic view of the interlock of FIG. 9 wherein the bade is engaged.

For a better understanding, the cooperation of the various elements of the interlock mechanism, FIGS. 8, 9, and 10 are provided to show the mechanism of FIGS. 6 and 7 in various operated positions. Many of the parts having been removed for simplicity of understanding with some shortening of control members having occurred. As seen in FIG. 8, brake arm 36 is in the brake "on" position under the force of spring 40 where the brake is applied and the wheels can not move, the brake lever being interconnected through rod 42 to lever 112 of the interlock. In effect, no operator is present with the control shown in the position of FIG. 8, and cam follower 120 is prevented from engaging cam 118 upon rotation of shaft 100 because of the position of pin 130.

In FIG. 9, the cam and cam follower are shown in the position where the operator presence lever 43 has been depressed thereby rotating lever 112 against the bias force of spring 40 and permitting the cam follower 120 to rotate to the indicated position which shows that the operator presence lever has been depressed and the wheels are free to rotate but shaft 100 is in the same position as in FIG. 8, indicating that the blade drive has not been engaged. In such position, the apparatus can be moved including movement by power of rotation of the drive wheels but the blade will not rotate because brake 76 remains applied as shown in FIG. 3.

Turning next to FIG. 10, shaft 100 is shown in the rotated position brought about by the movement of the blade engagement control lever 50 to shift rod 90 thereby rotating lever 108. The rotation of shaft 100 also rotates cam 118 to the position where the notch or step and cam follower 120 falls into position thereby to hold shaft 100 is in the desired position with the drive to the blade engaged. Clearly, if the operator presence control lever were to be released, lever 112 would rotate about shaft 100 under the force from spring 40 and pin 130 would elevate cam follower 120 thereby releasing the blade engagement lever and applying the brake 76 to the blade drive.

It is therefor seen that the present invention uniquely combines an operator presence control that automatically applies the brake to the wheels of the apparatus and effects immediate disengagement of the drive to the blades and the application of the blade brake to stop blade rotation. Such a system provides a convenience of control not heretofore believed to be attainable.

Although this invention has been illustrated and described with respect to exemplary embodiments thereof, it should be understood by those skilled in the art that various changes, omissions and additions may be made without departing from the spirit and scope of the invention.

We claim:

1. A control system for walk behind lawn, garden and drive way apparatus such as lawn mowers, snow blowers and the like comprising:

a frame, a drive motor supported on said frame for actuation of a grass cutting blade, snow blower blade or the like;

an operator moveable control member for connecting the blade to the motor drive for blade rotation, said moveable control having a disengageable interlock to disengage the drive to the blade;

a plurality of wheels supporting said frame for rotation by said motor through a power drive train;

a selectively releasable brake for precluding wheel rotation forming a part of said power drive train and including means biasing said brake to the engaged position;

a pair of handles extending upwardly and rearwardly from said frame and terminating in hand grips;

a first lever pivotally mounted adjacent one of said hand grips;

said first lever being connected to said releasable brake whereby grasping said one grip by the user serves to pivot said lever to overcome the bias force to release said brake; and means interconnecting the connection for said releasable brake and the disengageable interlock whereby releasing said pivotally mounted lever to automatically apply the brake actuates the interlock to disconnect the drive to said blade.

2. The apparatus of claim 1 including means precluding engagement of the blade with said motor drive for blade rotation until said lever is moved by the user to brake released position and said interlock is in the operative position.

3. The apparatus of claim 2 wherein the handle supporting said lever which is pivotally moveable toward the handle to release said brake also pivotally supports a second lever, a drive clutch is provided to selectively interconnect said motor and the drive to said power drive train, said second lever being user engageable.

4. The apparatus of claim 1 wherein the first pivotally mounted lever is structurally connected to the releasable brake to effect its release and the interlock extends between said structural connection and the actuating lever for moving the blade drive member.

5. The apparatus of claim 1 wherein said disengageable interlock is a rotatable stepped cam and cam follower supported by said frame, said cam follower being a notched lever engageable with said stepped cam to preclude cam rotation when the brake is released and the blade drive is engaged, said cam being rotatable upon brake application to release the blade drive.

* * * * *